(12) United States Patent
Tujkovic et al.

(10) Patent No.: US 9,014,651 B2
(45) Date of Patent: Apr. 21, 2015

(54) INTERFERENCE CANCELLATION IN MULTI-MODE RADIO ACCESS TECHNOLOGY DEVICES

(75) Inventors: Djordje Tujkovic, Santa Clara, CA (US); Louay Jalloul, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 252 days.

(21) Appl. No.: 13/608,357

(22) Filed: Sep. 10, 2012

(65) Prior Publication Data

US 2014/0073257 A1    Mar. 13, 2014

(51) Int. Cl.
*H04B 1/10* (2006.01)
*H04B 1/12* (2006.01)
*H04B 1/00* (2006.01)
*H04B 3/23* (2006.01)

(52) U.S. Cl.
CPC . *H04B 1/123* (2013.01); *H04B 3/23* (2013.01)

(58) Field of Classification Search
CPC ................................. H04B 1/10; H04B 1/109
USPC ................................................. 455/295, 296
See application file for complete search history.

(56) References Cited

U.S. PATENT DOCUMENTS

2004/0106381 A1    6/2004    Tiller
2007/0184782 A1    8/2007    Sahota et al.

FOREIGN PATENT DOCUMENTS

EP           0 187 672 A2    7/1986
WO    WO 2008/094259 A1    8/2008
WO    WO 2011/148341 A1    12/2011

OTHER PUBLICATIONS

European Search Report directed to related European Patent Application No. 13 00 3078, European Patent Office, The Hague, Netherlands, mailed Feb. 1, 2014; 4 pages.

*Primary Examiner* — Lee Nguyen
(74) *Attorney, Agent, or Firm* — Sterne, Kessler, Goldstein & Fox P.L.L.C.

(57) ABSTRACT

Embodiments of the present disclosure provide a novel multi-mode platform architecture with means for reducing the interference due to both out-of-band (OOB) emissions and intermodulation distortion (IMD) products caused by a first radio access technology (RAT) transmitter on a co-located second RAT receiver. The multi-mode platform architecture may be used in a variety of wireless devices and with a variety of co-located RATs, including, without limitation, WiFi, LTE, WiMAX, WCDMA, Bluetooth, and Zigbee, for example.

30 Claims, 6 Drawing Sheets

INTERFERENCE CANCELLATION IN MULTI-MODE RADIO ACCESS TECHNOLOGY DEVICES

BACKGROUND

1. Field of the Invention

The present disclosure relates generally to interference cancellation.

2. Background Art

Wireless devices, such as smart phones, for example, today integrate multiple radio access technologies (RATs) on a single device, including 4G (e.g., Long Term Evolution (LTE)), 3G, 2G, WiFi, Bluetooth (BT), Global Position System (GPS), etc. Due to the close proximity of the radio devices of the multiple RATs, the transmission of a first RAT can potentially interfere with the reception of a second RAT, despite the fact that the two RATs operate on separate bands. For instance, BT/WiFi operating in the ISM (Industrial, Scientific, and Medical) band, for example, can impact LTE operating in bands 7, 38, 40 and 41.

Existing solutions for mitigating interference between co-located RATs may be classified into two main categories. A first category includes adding sharp transmit and receive filters in the transceivers of the co-located RATs. A significant disadvantage of the first category of solutions is the increase in the bill of material (BOM) and the overall area/size of the platform due to the bulky acoustic type filters that must be added. Other disadvantages of this approach include increased noise figure at the receiver and increased insertion loss at the transmitter, both of which compromise the link performance and system throughput.

A second category of existing solutions includes scheduling and coordination between the RATs to insure non-overlapping transmission and reception. A main problem with the second category is that it sacrifices system throughput in order to reduce interference. The scheduling approach may also require changes to the air interface standards due to necessary signaling between the user equipment and the base station, for example.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

Wireless devices, such as smart phones, for example, today integrate multiple radio access technologies (RATs) on a single device, including 4G (e.g., Long Term Evolution (LTE)), 3G, 2G, WiFi, Bluetooth (BT), Global Position System (GPS), etc. Due to the close proximity of the radio devices of the multiple RATs, the transmission of a first RAT can potentially interfere with the reception of a second RAT, despite the fact that the two RATs operate on separate bands. For instance, BT/WiFi operating in the ISM (Industrial, Scientific, and Medical) band, for example, typically impacts LTE operating in bands 7, 38, 40 and 41.

Generally, interference caused by a first transmitting RAT on a second receiving RAT is due to out-of-band (OOB) emissions and/or inter-modulation distortion (IMD) products caused by the first RAT transmitter. This interference degrades the second RAT link performance and throughput and desensitizes the second RAT receiver.

Figure 1:
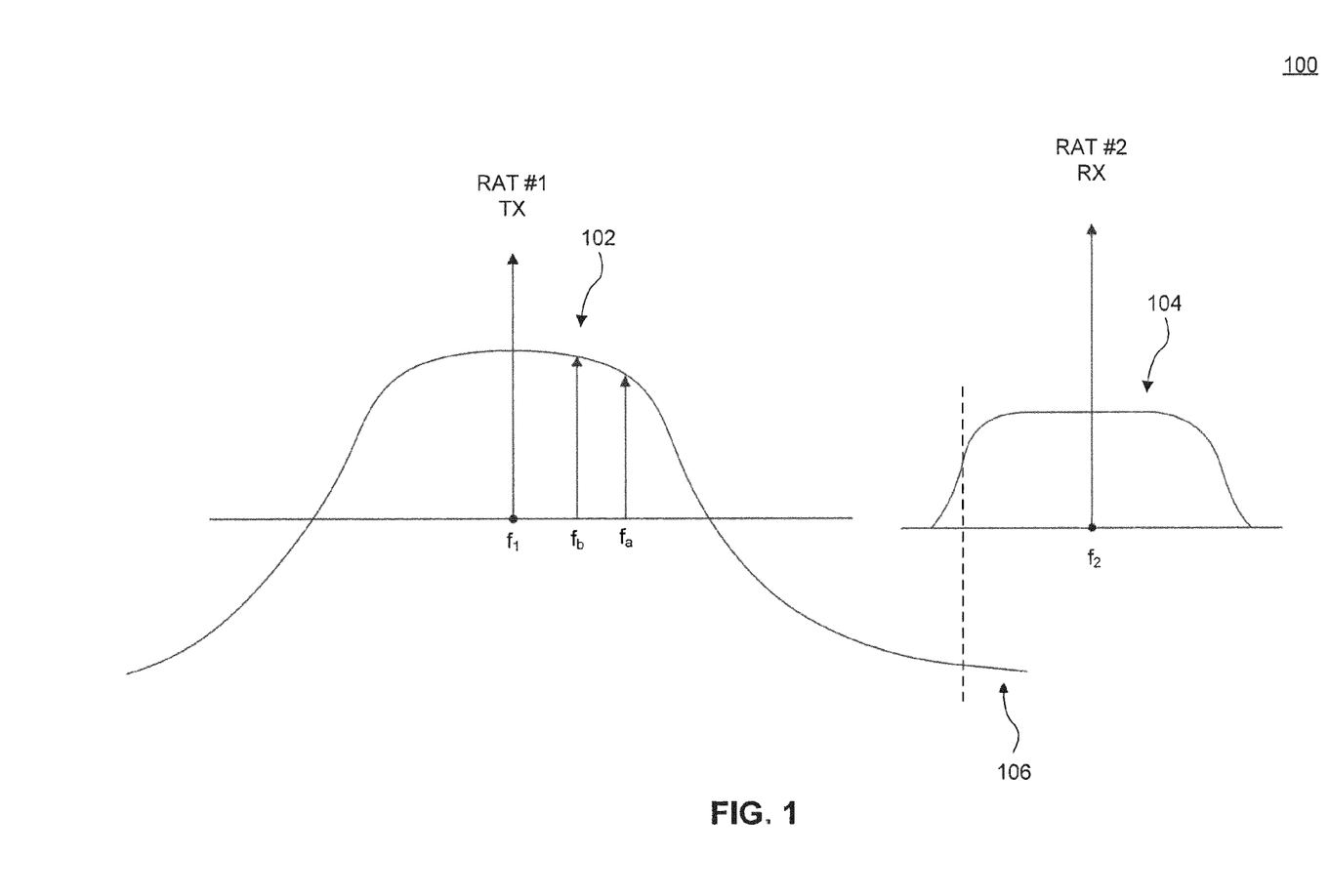
FIG. 1 is an example that illustrates the effects of the out-of-band emissions of a transmitter on a nearby receiver.

FIG. 1 is an example 100 that illustrates the effects of the out-of-band emissions of a first RAT transmitter on a nearby second RAT receiver. As shown in FIG. 1, the first RAT transmitter transmits a first signal over a first frequency spectrum 102, centered at a first frequency $f_1$. At the same time, the second RAT receiver is attempting to receive a second signal over a second frequency spectrum 104, centered at a second frequency $f_2$. Due to the proximity of the first RAT transmitter and the second RAT receiver, the first RAT transmitter's OOB emissions inject in-band noise 106 at the second RAT receiver.

In-band noise 106 may be higher than the second RAT receiver's thermal noise, which severely desensitizes the second RAT receiver. For example, the Federal Communications Commission (FCC) requires OOB emissions for unlicensed band devices to not exceed −41.25 dBm/MHz. Nevertheless, for a WiFi transmitter with 25 dB improved OOB emissions, the integrated noise level at a co-located LTE receiver due to WiFi transmissions is at −85.25 dBm per 20 MHz. This is approximately 12 dB above the LTE receiver's thermal noise over the same bandwidth.

Figure 2:
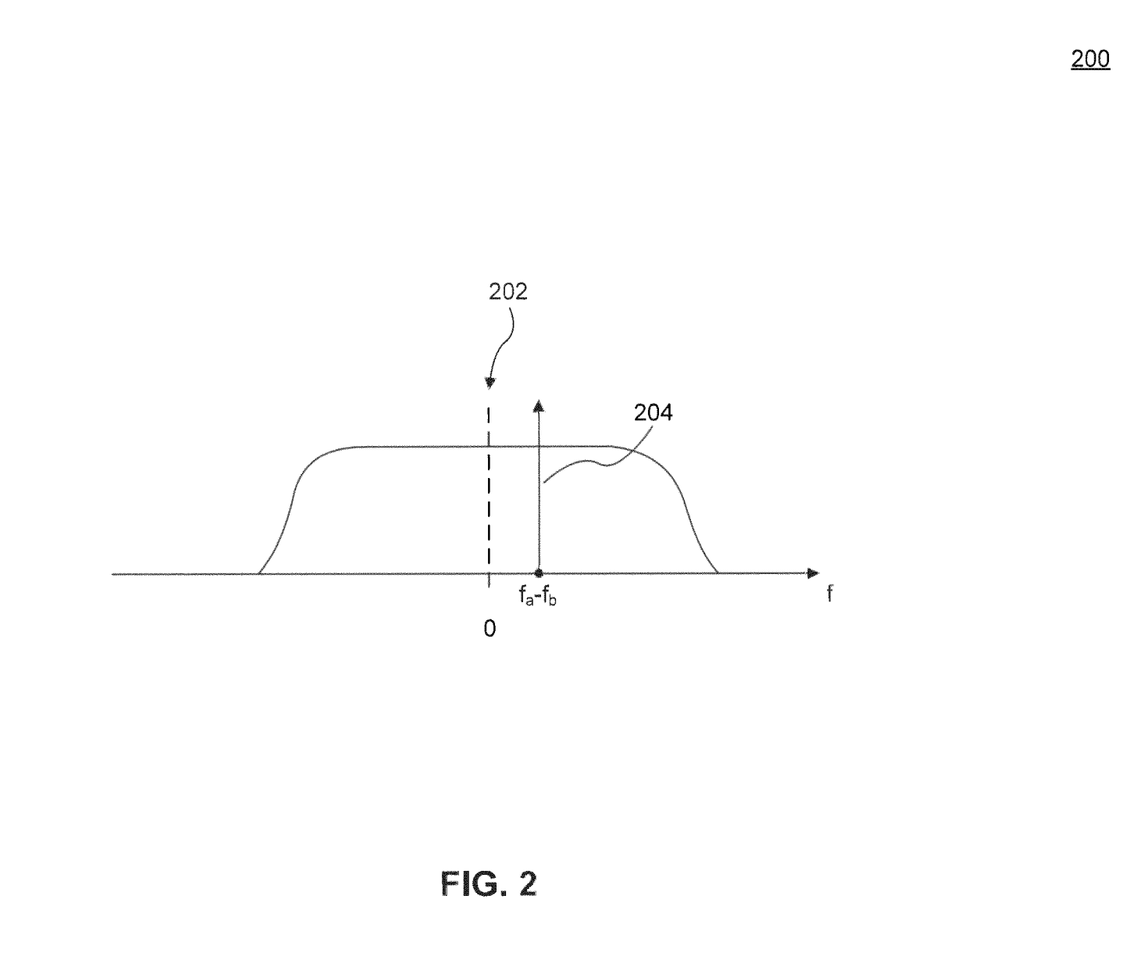
FIG. 2 is an example that illustrates the effects of inter-modulation distortion products due to a transmitted signal on a received signal.

In addition to in-band noise due to OOB emissions, in-band interference caused by inter-modulation distortion (IMD) products of the first RAT signal may appear at the second RAT receiver. These IMD products are typically due to non-linearities in the second RAT receiver, which result in the first RAT signal leaking and mixing with itself at the second RAT receiver. For example, frequency components $f_a$ and $f_b$ of the first RAT signal, shown in FIG. 1, may mix with each other at the second RAT receiver. The resulting products, as shown in FIG. 2, may include baseband (or close to baseband) products (e.g., $f_a$-$f_b$ 204) that manifest themselves in the baseband second RAT signal 202.

As in the case of OOB emissions, IMD products may also be higher than the thermal noise at the second RAT receiver. For example, for an LTE receiver with an excellent second order intercept point (IIP2) of 65 dBm (IIP2 is a measure of the non-linearity of a system), the in-band second-order inter-modulation products (IM2) caused by a Power Class 2 WiFi transmitter transmitting at +23 dBm in 20 MHz bandwidth is approximately −74 dBm. This IM2 interference level is 26 dB above the LTE receiver thermal noise over a 20 MHz bandwidth.

Existing solutions for mitigating interference between co-located RATs may be classified into two main categories. A first category includes adding sharp transmit and receive filters in the transceivers of the co-located RATs. A significant disadvantage of the first category is the increase in the bill of material (BOM) and the overall area/size of the platform due to the bulk acoustic filters that must be added. Other disadvantages of this approach include increased noise figure at the receiver and increased insertion loss at the transmitter, both of which compromise the link performance and system throughput. A second category of existing solutions includes scheduling and coordination between the RATs to insure non-overlapping transmission and reception. A main problem with the second category is that it sacrifices system throughput in order to reduce interference. The scheduling approach may also require changes to standards due to necessary signaling between the user equipment and the base station, for example.

Embodiments of the present disclosure, as further described below, provide a novel multi-mode platform architecture with means for reducing the interference due to both OOB emissions and IMD products caused by a first RAT transmitter on a co-located second RAT receiver. The multi-mode platform architecture may be used in a variety of wireless devices and with a variety of co-located RATs, including, without limitation, WiFi, LTE, WiMAX, WCDMA, Bluetooth, and Zigbee, for example. Example embodiments of the present disclosure will now be described. These example embodiments are provided for the purpose of illustration and are not limiting.

Figure 3:
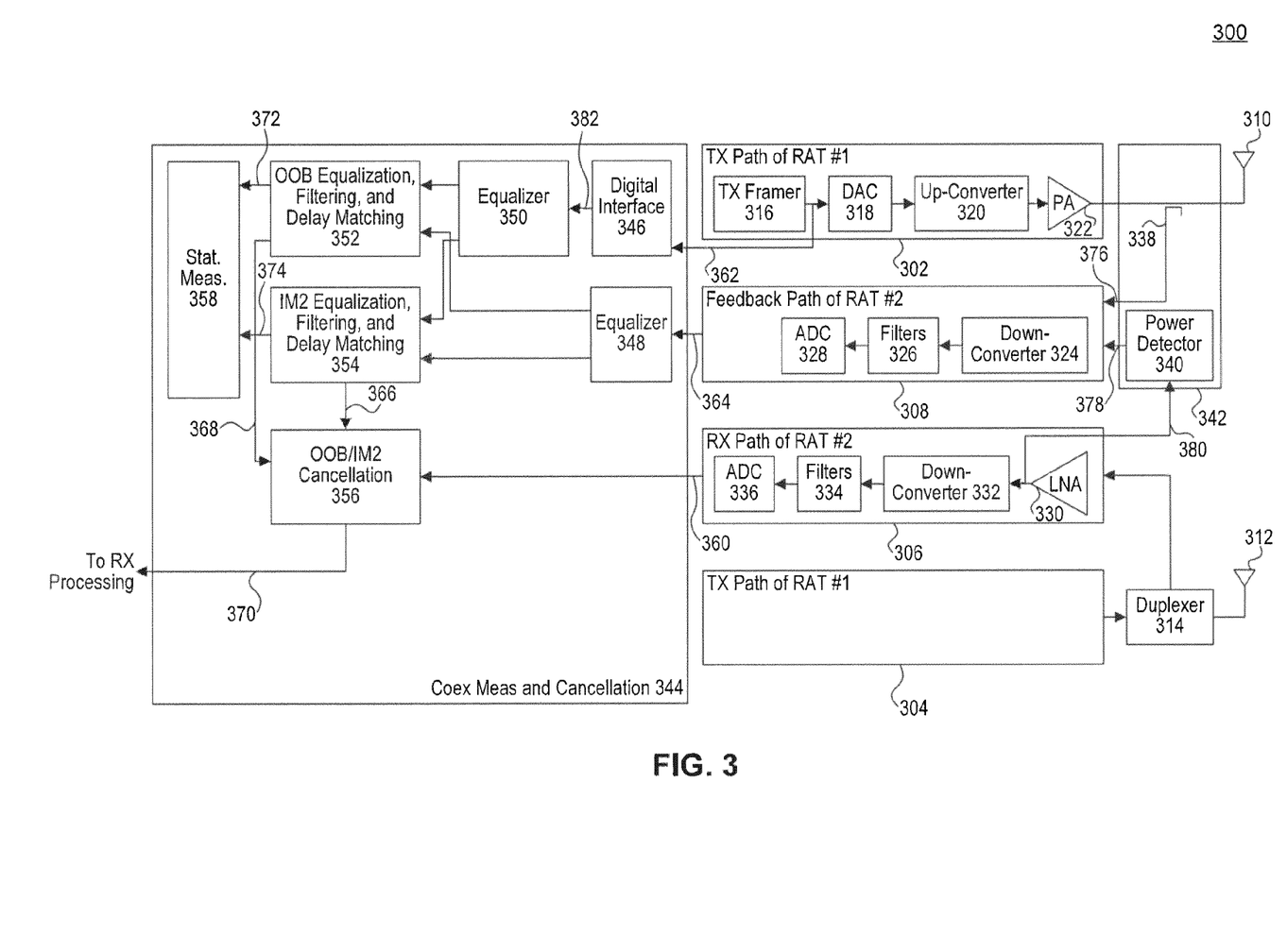
FIG. 3 illustrates an example system according to an embodiment of the present disclosure.

FIG. 3 illustrates an example system 300 according to an embodiment of the present disclosure. Example system 300 is provided for the purpose of illustration only and is not limiting. As shown in FIG. 3, example system 300 includes a transmit (TX) path 302 of a first radio access technology (RAT), a TX path 304 of a second RAT, a receive (RX) path 306 of the second RAT, a feedback receive path 308 of the second RAT, a provisioning module 342, and a coexistence measurement and cancellation module 344. As would be understood by a person of skill in the art based on the teachings herein, example system 300 may include more or less components than shown in FIG. 3. In an embodiment, some or all of the components of example system 300 may be located on a same semiconductor chip.

Example system 300 may be located in a wireless device, such as a cellular handset, for example. The wireless device may communicate according to the first and/or the second RAT. Without limitation, the first and second RATs may be any two of WiFi, LTE, WiMAX, WCDMA, Bluetooth, and Zigbee, for example.

In an embodiment, the wireless device may communicate using both the first and the second RATs at the same time. When that occurs, transmissions by the first RAT may interfere with received signals of the second RAT, and vice versa. Interference as described above may be in the form of OOB emissions and/or IMD products, for example. One or more components of example system 300 may be used, as further described below, to reduce the effects of interference caused by the first RAT on the second RAT, and vice versa. For the purpose of illustration, example system 300 will be described herein with the assumption that interference is caused by the transmitter of the first RAT on the receiver of the second RAT. As would be understood by a person of skill in the art based on the teachings herein, embodiments may equally be used, alternatively or additionally, to reduce interference caused by transmissions of the second RAT on the receiver of the first RAT.

Receive path 306 of the second RAT is configured to receive a radio frequency (RF) signal via antenna 312 and duplexer 314. In an embodiment, as shown in FIG. 3, receive path 306 may include a low-noise amplifier (LNA) 330, a frequency down-converter 332, one or more filters (e.g., low-pass filters) 334, and one or more analog-to-digital converters (ADCs) 336.

From the received signal, receive path 306 is configured to generate a first signal 360. In an embodiment, the received signal includes a wanted signal (e.g., signal of the second RAT, intended for the second RAT receiver) and interference due to an interfering signal from TX path 302 of the first RAT. As such, the first signal includes a desired signal (that results from the wanted signal) and an undesired signal that results from the interfering signal. It is noted that the interfering signal, as used herein, may refer to any signal from TX path 302, including, for example, the output signal of TX framer 316, the output signal of digital-to-analog converter (DAC) 318, the output signal of up-converter 320, the output signal of power amplifier (PA) 322, and the output signal of antenna 310, or from RX path 306, which results in the undesired signal in first signal 360 generated by RX path 306.

The undesired signal portion of first signal 360 may include OOB emissions and/or IMD products due to the interfering signal. In the following, several example modes of operating system 300 will be described. The modes can be used to reduce the undesired signal (whether in the form of OOB emissions and/or IMD products) in first signal 360. The modes operate by producing a replica (or a substantially similar version) of the undesired signal portion of first signal 360 from the interfering signal, and then subtracting this undesired signal replica (or substantially similar version) from first signal 360. As would be understood by a person of skill in the art based on the teachings herein, embodiments are not limited by these example modes of operation. Other modes of operating example system 300, and other system variations of example system 300, will be apparent to a person of skill in the art based on the teachings herein. As will be apparent to a person of skill in the art based on the teachings herein, the modes described herein may be applied individually or in combination with each other.

In a first mode of operation, the undesired signal replica is generated using provisioning module 342, feedback receive path 308, and one or more components of coexistence measurement and cancellation module 344. Specifically, the interfering signal is assumed to be the signal at the output of PA 322 of TX path 302 or of antenna 310. Feedback receive path 308 is coupled using a coupler 338 of provisioning module 342 to the output signal of PA 322 or antenna 310 of TX path 302. As shown in FIG. 3, feedback receive path 308 may include a down-converter 324, one or more filters 326 (e.g., low-pass filters), and one or more ADCs 328. Feedback receive path 308 is configured to generate a signal 364 from the interfering signal. In an embodiment, down-converter 324 is configured to down-convert a signal 376 from coupler 338 based on a transmit center frequency of the interfering signal to generate signal 364.

Figure 4A:
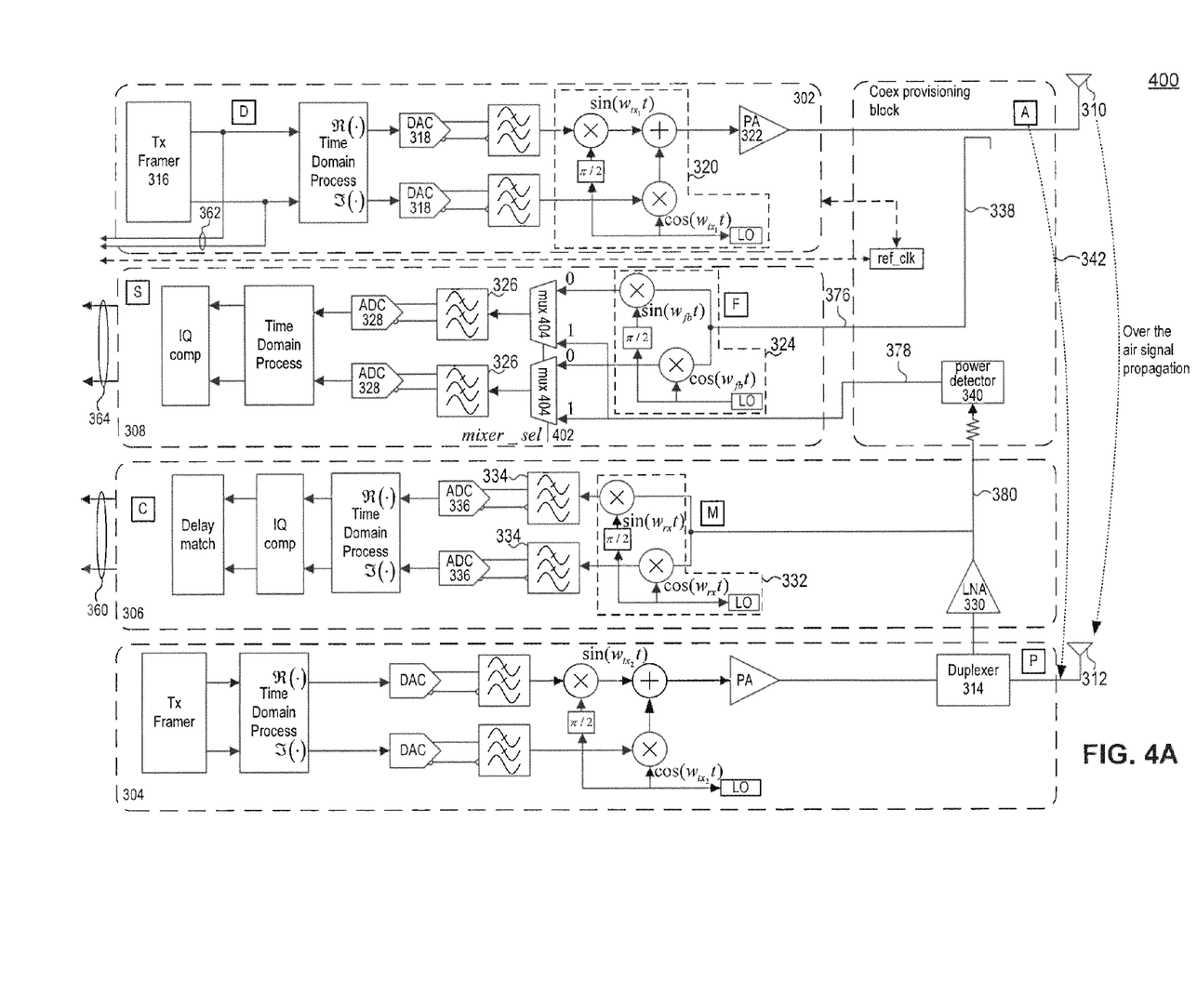
FIGS. 4A-B illustrate an example system according to an embodiment of the present disclosure.

Subsequently, to ensure that the undesired signal replica is as close as possible to the undesired signal portion of first signal 360, signal 364 is adjusted based on a difference between a first transfer function of a first path, traversed by the interfering signal to produce the undesired signal portion of first signal 360, and a second transfer function of a second path, traversed by the interfering signal to produce signal 364. With the interfering signal assumed to be the signal at the output of PA 322 or of antenna 310, the first path, in an embodiment, includes an over-the-air propagation path between antenna 310 and antenna 312 and the path from antenna 312 to the output of RX path 306. The second path, in an embodiment, includes the path from antenna 310 to the output of feedback receive path 308. Additionally, signal 364 may be adjusted to compensate for a timing offset between the first path and the second path, to ensure that samples of the undesired signal replica align with corresponding samples of the undesired signal portion of first signal 360. In another embodiment, with the interfering signal assumed to be the signal at the output of PA 322, the first path includes a board coupling path (path from A to P as shown in FIG. 4A) that couples the output of PA 322 to duplexer 314.

In an embodiment, signal 364 is adjusted, as described above, by equalizer 348 and one or more of modules 352 and 354. In an embodiment, equalizer 348 is a complex equalizer configured to adjust the gain and/or phase of signal 364. Modules 352 and 354 may each include additional equalizers, adaptive filters, and/or delay match modules that may be used to further adjust signal 364 as described above.

In an embodiment, module 352 is configured to produce a signal 368, which includes a replica (or a substantially similar version) of an OOB emissions portion of the undesired signal portion of first signal 360. Module 352 may thus include a frequency modulator configured to convert signal 364 to a center frequency equal to a difference between the transmit center frequency of the interfering signal and a receive center frequency of the desired signal. This frequency conversion ensures that signal 368 is aligned with the OOB emissions portion of the undesired signal portion of first signal 360.

In the same or another embodiment, module 354 is configured to produce a signal 366, which includes a replica (or a substantially similar version) of an IMD products portion of the undesired signal portion of first signal 360. Module 354 may thus include a multiplier module configured to produce the squared magnitude of signal 364 (e.g., by multiplying signal 364 by itself). The squaring of signal 364 produces similar or same IMD products of the interfering signal as may be present in first signal 360.

OOB/IM2 cancellation module 356 is configured to receive signal 366 and/or signal 368 and to subtract signal 366 and/or signal 368 from first signal 360 to produce a signal 370. Signal 370, which has reduced OOB emissions and IMD products due to the interfering signal, may be forwarded for further receiver processing.

In a second mode of operation, the IMD products portion of the undesired signal replica is generated using provisioning module 342, feedback receive path 308, and one or more components of coexistence measurement and cancellation module 344. Specifically, the interfering signal is assumed to be a portion of an output signal 380 of LNA 330 of RX path 306. Output signal 380 is coupled via a power detector 340 (of provisioning module 342) to feedback receive path 308. An output signal 378 of power detector 340 includes all or substantially all of the power spectrum of signal 380, including both the interfering signal and desired components of the wanted second RAT signal. Feedback receive path 308 is configured to generate signal 364 from the output signal 378 of power detector 340. In an embodiment, down-converter 324 is bypassed in feedback receive path 308 in this mode of operation.

Then, as above, signal 364 is adjusted based on a difference between a first transfer function of a first path, traversed by the interfering signal to produce the undesired signal portion of first signal 360, and a second transfer function of a second path, traversed by the interfering signal to produce signal 364. With the interfering signal assumed to be a portion of output signal 380 of LNA 330, the first path, in an embodiment, includes the path from the output of LNA 330 to the output of RX path 306. The second path, in an embodiment, is the path from the output of LNA 330 to the output of feedback receive path 308. Additionally, signal 364 may be adjusted to compensate for a timing offset between the first path and the second path, to ensure that samples of the undesired signal replica align with corresponding samples of the undesired signal portion of first signal 360.

In an embodiment, signal 364 is adjusted, as described above, by equalizer 348 and module 354. Specifically, module 354 is configured to produce signal 366, which, in this mode of operation, includes a replica (or a substantially similar version) of the IMD products portion of signal 360 that are due to both the interfering signal and the wanted signal. OOB/IM2 cancellation module 356 is configured to receive signal 366 and to subtract signal 366 from first signal 360 to produce signal 370.

In an third mode of operation, the undesired signal replica is generated by deriving a signal from within TX path 302 and using and one or more components of coexistence measurement and cancellation module 344. Specifically, in this mode, the interfering signal is assumed to a non-RF signal of TX path 302 (can be at any signal point of TX path 302 that can be sensed).

In an embodiment, as shown in FIG. 3, the interfering signal is assumed to be an output signal 362 of TX framer 316 of TX path 302. Signal 362 is routed to a digital interface 346 of module 344. Digital interface 346 generates a signal 382, which may be identical to signal 362. In an embodiment, digital interface 346 adjusts a sample rate of signal 382 according to a sampling rate difference between the desired signal (which has a sample rate according to the first RAT) and the interfering signal (which has a sample rate according to the second RAT). In an embodiment, the sample rate of signal 382 and the sample rate of the desired signal are derived from a common reference clock provided to both TX path 302 and module 344.

Then, as above, signal 382 is adjusted based on a difference between a first transfer function of a first path, traversed by the interfering signal to produce the undesired signal portion of first signal 360, and a second transfer function of a second path, traversed by the interfering signal to produce signal 382. With the interfering signal assumed to be the output signal of TX framer 316, the first path, in an embodiment, includes the path from the output of TX framer 316 to antenna 310, the over-the-air propagation path between antenna 310 and antenna 312, and the path from antenna 312 to the output of receive path 306. The second path includes the path from the output of TX framer 316 and digital interface 346. Additionally, signal 382 may be adjusted to compensate for a timing offset between the first path and the second path, to ensure that samples of the undesired signal replica align with corresponding samples of the undesired signal portion of first signal 360. In an embodiment, the second path has a negligible transfer function and/or delay. Signal 382 is thus adjusted only based on the transfer function and a delay of the first path.

In an embodiment, signal 382 is adjusted, as described above, by equalizer 350 and one or more of modules 352 and 354. In an embodiment, equalizer 350 is a complex equalizer configured to adjust the gain and/or phase of signal 382. Modules 352 and 354 may each include additional equalizers, adaptive filters, and/or delay match modules that may be used to further adjust signal 382 as described above. Modules 352 and 354 may be operated in a similar fashion as described above with respect to the first mode of operation to produce signals 368 and 366, respectively. OOB/IM2 cancellation module 356 subtracts signals 368 and 366 from first signal 360 to produce signal 370.

Statistics measurement module 358 is configured to receive signals 372 and 374 from modules 352 and 366 respectively. Module 358 produces various measurements and statistics based on signals 372 and 374, which can be used by OOB/IM2 cancellation module 356, for example.

Figure 4B:
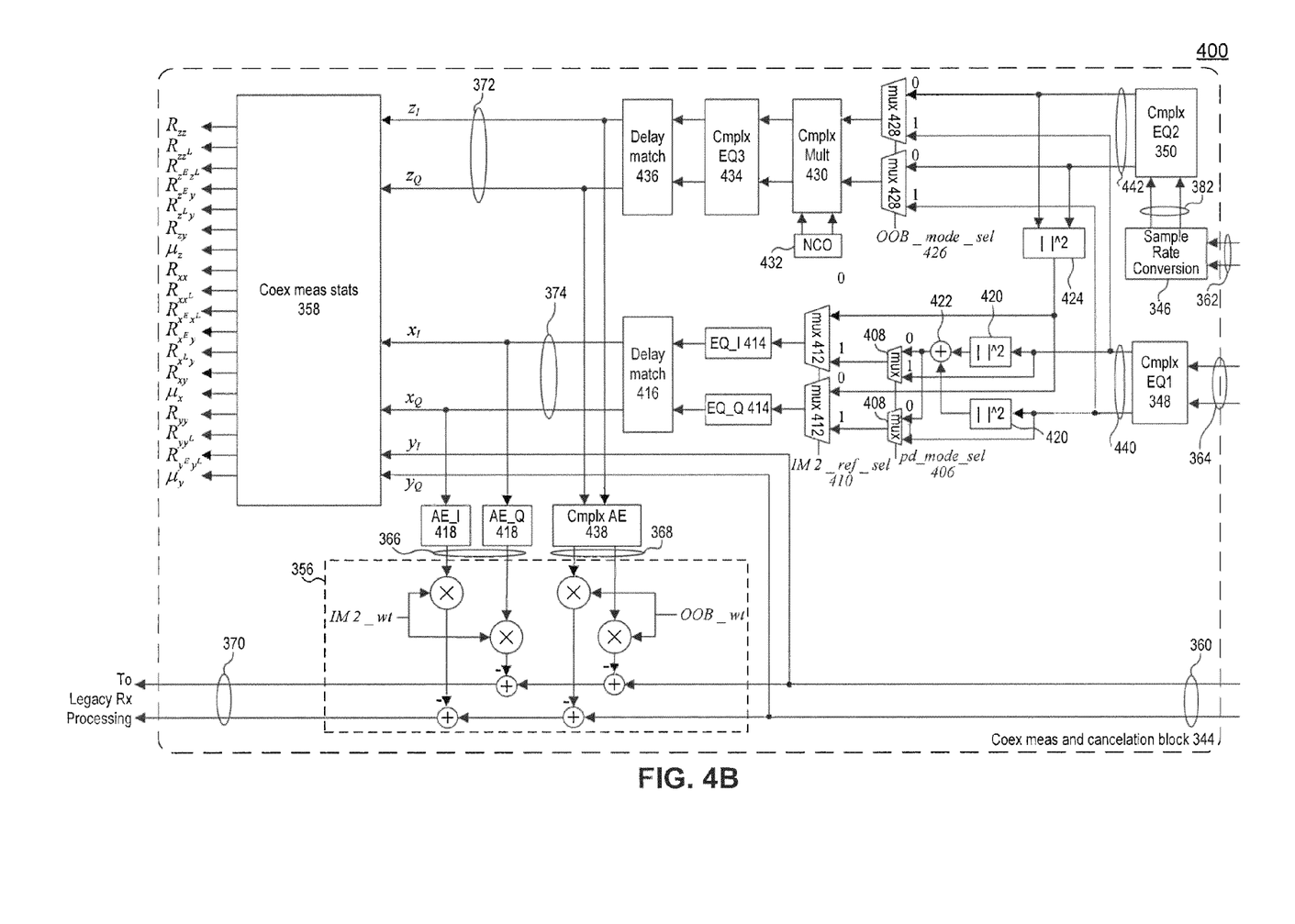

FIGS. 4A-B illustrate an example system 400 according to an embodiment of the present disclosure. Example system 400 is provided for the purpose of illustration only and is not limiting of embodiments of the present disclosure. Example system 400 may be an embodiment of example system 300 or a portion thereof, and may thus be operated in a similar fashion as described above with respect to example system 300. For the purpose of illustration, the example modes of operation described above with respect to example system 300 are now described with respect to example system 400.

In the first mode of operation, feedback receive path 308 is coupled using coupler 338 to the output of PA 322 or antenna 310 of TX path 302. Output signal 376 of coupler 338 is down-converted to baseband by down-converter 324, which may be an in-phase (I)/quadrature (Q) down-converter. Multiplexers 404 are controlled appropriately by a select signal 402 (set to 0 in this mode) to couple the output of down-converter 324 to filters 326. The down-converter output is filtered by filters 326 and then converted to digital form by ADCs 328. Subsequent time domain processing and IQ compensation may be applied to the output of ADCs 328, to generate second signal 364.

At the same or a different time, receive path 306 generates first signal 360 from an RF signal received via antenna 312 and duplexer 314. The received RF signal is processed by LNA 330, down-converted to baseband by down-converter 332, filtered by filters 334, and then converted to digital form by ADCs 336. The output of ADCs 336 may subsequently undergo time domain processing, IQ compensation, and/or delay matching as appropriate, to generate first signal 360.

First signal 360 and signal 364 are fed to coexistence measurement and cancellation module 344. First signal 360 is forwarded to OOB/IM2 cancellation module 356. Signal 364 is first processed by equalizer 348 to generate a signal 440. In an embodiment, equalizer 348 is a complex equalizer configured to compensate for any differences (e.g., transfer function, delay, etc.) between signal propagation paths A to M and A to S, as shown in FIG. 4A. As such, equalizer 348 may adjust signal 364 according to these differences.

Signal 440 is then forwarded for further processing in connection with reducing the OOB emissions and the IMD products due to the interfering signal. Specifically, signal 440 is provided to modules 420 and then to adder 422 to produce the squared magnitude of signal 440. The squaring of signal 440 produces similar or same IMD products of the interfering signal as may be present in first signal 360. Multiplexers 408 and 412 are controlled appropriately by respective select signals 406 and 410 (select signal 406 is set to 0 and select signal 410 is set to 1 in this mode) to couple the output of adder 422 to equalizer modules 414. Equalizers 414, delay match module 416, and adaptive equalizers 418 process the output of adder 422 to generate signal 366. In an embodiment, equalizers 414, delay match module 416, and adaptive equalizers 418 emulate filters 334 and the delay of receive path 306. In embodiments, equalizer 348, equalizers 414, and delay match module 416 are programmed in a semi-static fashion based on prior calibration steps. Adaptive equalizers 418 may be programmed similarly but also may track real time variations based on information received from statistics measurement module 358.

At the same or a different time, multiplexers 428 are controlled appropriately by a select signal 426 (select signal 426 is set to 1 in this mode) to couple signal 440 of equalizer 348 to a complex multiplier 430. Complex multiplier 430 is driven by a numerically controlled oscillator (NCO) 432 and is configured to modulate signal 440 to a center frequency equal to a difference between the transmit center frequency of the interfering signal and a receive center frequency of the desired signal. By modulating signal 440, the OOB emissions due to the interfering signal are translated in frequency by the same amount as the received signal is translated by receive path 306. The output of complex multiplier 430 is then provided to complex equalizer 434. Equalizer 434, delay match module 436, and adaptive complex equalizer 438 process the output of complex multiplier 430 to generate signal 368. In an embodiment, equalizer 434, delay match module 436, and adaptive complex equalizer 438 emulate the signal propagation path P to C as shown in FIG. 4A. In embodiments, equalizer 348, equalizer 434, and delay match module 436 are programmed in a semi-static fashion based on prior calibration steps. Adaptive equalizer 438 may be programmed similarly but also may track real time variations based on information received from statistics measurement module 358.

Signals 366 and 368 are then input to OOB/IM2 cancellation module 356. OOB/IM2 cancellation module 356 subtracts signals 366 and 368 from first signal 360 to produce signal 370. Signal 370, which has reduced OOB emissions and IMD products due to the interfering signal, may be forwarded for further receiver processing. In an embodiment, signals 366 and 368 are multiplied by respective weights inside OOB/IM2 cancellation module 356 before being subtracted from first signal 360. The respective weights may be provided by statistics measurement module 358, and may be based on a confidence level associated with signals 366 and 368.

In the second mode of operation, feedback receive path 308 is coupled using power detector 340 to output signal 380 of LNA 330. Multiplexers 404 are controlled appropriately by select signal 402 (set to 1 in this mode) to couple output signal 378 of power detector 340 to filters 326, bypassing down-converter 324. Output signal 378 is filtered by filters 326 and then converted to digital form by ADCs 328. Subsequent time domain processing and IQ compensation may be applied to the output of ADCs 328, to generate second 364. At the same or a different time, first signal 360 is generated by receive path 306 as described above with respect to the first mode of operation.

First signal 360 and signal 364 are fed to coexistence measurement and cancellation module 344. First signal 360 is forwarded to OOB/IM2 cancellation module 356. Signal 364 is passed through equalizer 348 (which is not active in this mode) or may bypass equalizer 348 to generate signal 440. Multiplexers 408 and 412 are controlled appropriately by respective select signals 406 and 410 (select signal 406 is set to 1 and select signal 410 is set to 1 in this mode) to couple signal 440 to equalizer modules 414. It is noted that because signal 364 is derived in this mode from power detector 340, the IMD products due to both the interfering signal and the wanted signal are already present in signal 364. For this reason, the squaring of signal 440 is bypassed in this mode. Equalizers 414, delay match module 416, and adaptive equalizers 418 process signal 440 to generate signal 366. In an embodiment, equalizers 414, delay match module 416, and adaptive equalizers 418 are configured to compensate for any differences in transfer functions between filters 334 of receive path 306 and filters 326 of feedback receive path 308. In embodiments, equalizers 414 and delay match module 416 are programmed in a semi-static fashion based on prior calibration steps. Adaptive equalizers 418 may be programmed similarly but also may track real time variations based on information received from statistics measurement module 358.

In this mode, only signal 366 is generated from signal 364. Signal 366 is then subtracted by OOB/IM2 cancellation module 356 from first signal 360 to generate signal 370.

In the third mode of operation, output signal 362 of TX framer 316 of TX path 302 is coupled to digital interface 346 of coexistence measurement and cancellation module 344. Digital interface 346 generates a signal 382, which may be identical to signal 362. In an embodiment, digital interface 346 adjusts a sample rate of signal 382 according to a sampling rate difference between the desired signal (which has a sample rate according to the first RAT) and the interfering signal (which has a sample rate according to the second RAT). At the same or a different time, first signal 360 is generated by receive path 306 as described above with respect to the first mode of operation.

First signal 360 is forwarded to OOB/IM2 cancellation module 356. Signal 382 is first processed by equalizer 350 to generate a signal 442. In an embodiment, equalizer 350 is a complex equalizer configured to model the signal propagation path D to M as shown in FIG. 4A.

Signal 442 is then forwarded for further processing in connection with reducing the OOB emissions and the IMD products due to the interfering signal. Specifically, signal 442 is provided to module 424 to produce the squared magnitude of signal 442. The squaring of signal 442 produces similar or same IMD products of the interfering signal as may be present in first signal 360. Multiplexers 412 are controlled appropriately by select signal 410 (select signal 410 is set to 0 in this mode) to couple the output of module 424 to equalizer modules 414. Equalizers 414, delay match module 416, and adaptive equalizers 418 process the output of adder 422 to generate signal 366. In an embodiment, equalizers 414, delay match module 416, and adaptive equalizers 418 emulate filters 334 and the delay of receive path 306. In embodiments, equalizer 350, equalizers 414, and delay match module 416 are programmed in a semi-static fashion based on prior calibration steps. Adaptive equalizers 418 may be programmed similarly but also may track real time variations based on information received from statistics measurement module 358.

At the same or a different time, multiplexers 428 are controlled appropriately by select signal 426 (select signal 426 is set to 0 in this mode) to couple signal 442 to complex multiplier 430. In an embodiment, signal 442 is generated by programming equalizer 350 to model the signal propagation path D to P as shown in FIG. 4A.

Complex multiplier 430 is driven by a numerically controlled oscillator (NCO) 432 and is configured to modulate signal 442 to a center frequency equal to a difference between the transmit center frequency of the interfering signal and a receive center frequency of the desired signal. By modulating signal 442, the OOB emissions due to the interfering signal are translated in frequency in the same amount as the received signal is translated by receive path 306. The output of complex multiplier 430 is then provided to complex equalizer 434. Equalizer 434, delay match module 436, and adaptive complex equalizer 438 process the output of complex multiplier 430 to generate signal 368. In an embodiment, equalizer 434, delay match module 436, and adaptive complex equalizer 438 emulate the signal propagation path P to C as shown in FIG. 4A. In embodiments, equalizer 350, equalizer 434, and delay match module 436 are programmed in a semi-static fashion based on prior calibration steps. Adaptive equalizer 438 may be programmed similarly but also may track real time variations based on information received from statistics measurement module 358.

Signals 366 and 368 are then input to OOB/IM2 cancellation module 356. OOB/IM2 cancellation module 356 subtracts signals 366 and 368 from first signal 360 to produce signal 370. Signal 370, which has reduced OOB emissions and IMD products due to the interfering signal, may be forwarded for further receiver processing. In an embodiment, signals 366 and 368 are multiplied by respective weights inside OOB/IM2 cancellation module 356 before being subtracted from first signal 360. The respective weights may be provided by statistics measurement module 358, and may be based on a confidence level associated with signals 366 and 368.

Figure 5:
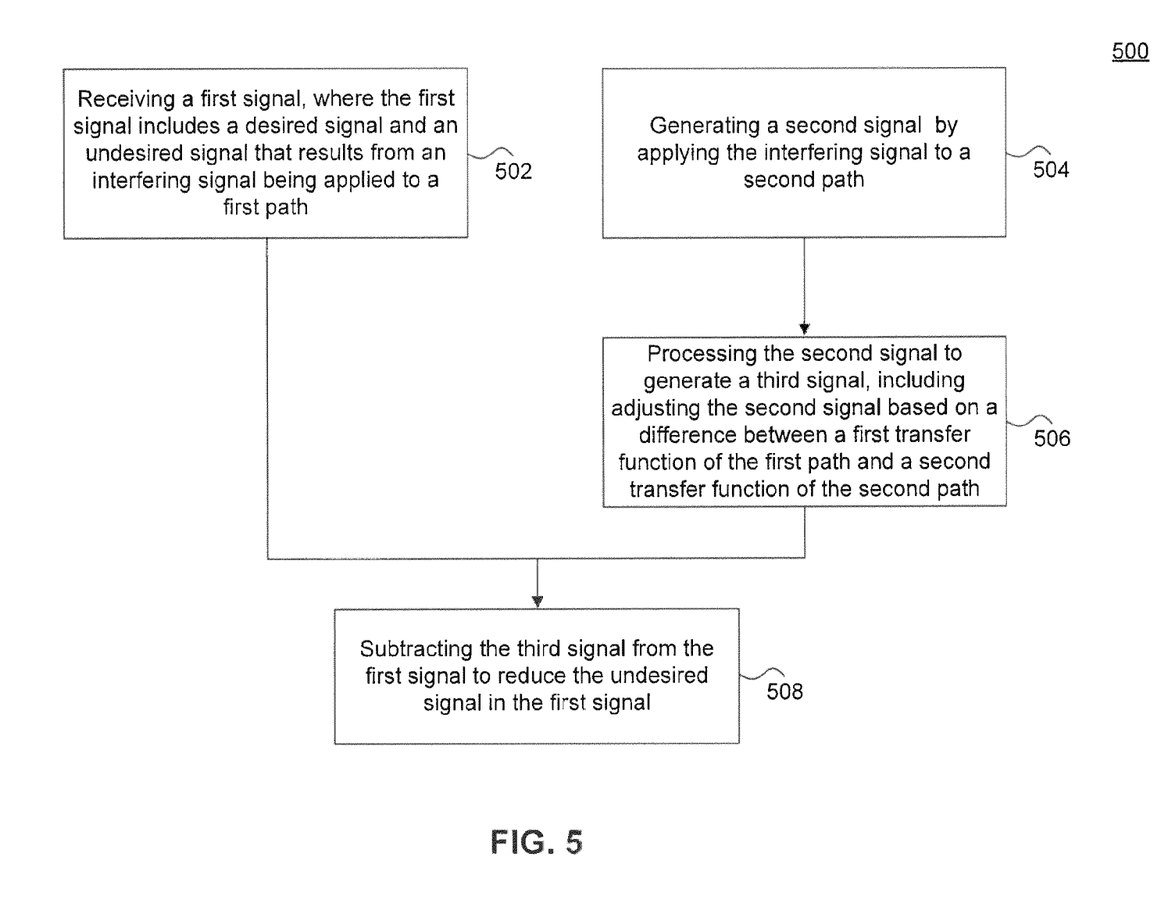
FIG. 5 is a process flowchart of a method for reducing interference in a receiver according to an embodiment of the present disclosure.

FIG. 5 is a process flowchart 500 of a method for reducing interference in a receiver according to an embodiment of the present disclosure. Process 500 may be used by a receiver of a first RAT to reduce interference from a co-located transmitter of a second RAT. As shown in FIG. 5, process 500 includes steps 502, 504, 506, and 508.

Process 500 begins in step 502, which includes receiving a first signal, where the first signal includes a desired signal and an undesired signal that results from an interfering signal being applied to a first path. Step 502 may be performed by a cancellation module, such as OOB/IM2 cancellation module 356, for example. Accordingly, the first signal may be an output of a receive path, such as receive path 306, for example. In an embodiment, the desired signal is of the first RAT and the interfering signal is of the second RAT. The undesired signal may include OOB emissions and/or IMD products due to the interfering signal.

The interfering signal may be a signal of a transmit path of the co-located transmitter (may be derived from any point of the transmit path of the co-located transmitter) of the second RAT, or a component of a signal of the receive path of the receiver. For example, in an embodiment, the interfering signal is a radio frequency (RF) signal (e.g., PA or antenna output signal) of the transmit path of the co-located transmitter, and the first path includes an over-the-air propagation path between an antenna of the co-located transmitter and an antenna of the receiver and the receive path of the receiver. In another embodiment, the interfering signal is a non-RF signal of the transmit path (e.g., an output of a transmit framer of the transmit path) of the co-located transmitter, and the first path further includes a portion of the transmit path of the co-located transmitter (e.g., from the framer output to the antenna of the co-located transmitter). In a further embodiment, the interfering signal is a component of an RF signal of the receive path of the receiver, and the first path includes a portion of the receive path of the receiver.

Returning to process 500, at the same or different time as step 502, process 500 includes, in step 504, generating a second signal by applying the interfering signal to a second path. Step 504 may be performed by a feedback receive path or an interface (e.g., digital interface) of the receiver, in conjunction with other components (e.g., multiplexers, switches, select signals, etc.) that may be used to a couple a signal to a circuit path, for example.

In an embodiment, the interfering signal is an RF signal of the transmit path (e.g., antenna output signal) of the co-located transmitter, and the second path includes a feedback receive path of the receiver. Accordingly, in an embodiment, step 504 further includes coupling the feedback receive path to the antenna of the co-located transmitter. Step 504 may further include down-converting the signal received by the feedback receive path based on a transmit center frequency of the interfering signal to generate the second signal. In an embodiment, the down-converting converts to baseband the signal received by the feedback receive path.

In another embodiment, with the interfering signal being a component of an RF signal of the receive path of the receiver, step 504 further includes coupling the feedback receive path to a power detector, which is coupled to the RF signal of the receive path. In an embodiment, the RF signal is the output signal of a low-noise amplifier (LNA) of the receive path. It is noted that, in this embodiment, the signal received by the feedback receive path includes both a wanted signal (which results in the desired signal at the output of the receive path) and the interfering signal.

In another embodiment, the interfering signal is a non-RF signal of the transmit path (e.g., any signal point of the transmit path that can be sensed) of the co-located transmitter, and the second path includes an interface for receiving the interfering signal. In an embodiment, the interfering signal is the output signal of a transmit framer of the transmit path of the co-located transmitter, and the second path includes a digital interface configured to receive the output signal of the transmit framer.

After step 504, process 500 includes, in step 506, processing the second signal to generate a third signal, including adjusting the second signal based on a difference between a first transfer function of the first path and a second transfer function of the second path. Step 504 may be performed by one or more equalizers (e.g., equalizers 348, 350, 414, 418, 434, and 438) or filters. In an embodiment, step 506 further includes adjusting the second signal based on a delay difference between the first path and the second path to generate the third signal.

In another embodiment, where the second signal is generated from a non-RF signal of the transmit path of the co-located transmitter (e.g., by a digital interface of the receiver, from the output of the transmit framer of the co-located transmitter), step 506 may further include converting a sample rate of the second signal according to a sampling rate difference between the desired signal (which has a sample rate according to the first RAT) and the interfering signal (which has a sample rate according to the second RAT).

In another embodiment, step 506 may further include converting the second signal to a center frequency, wherein the center frequency is equal to a difference between the transmit center frequency of the interfering signal and a receive center frequency of the desired signal. This frequency conversion is needed when the first signal results from down-converting to baseband a received signal by the receive path of the receiver. By converting the second signal as described above, the OOB emissions due to the interfering signal are translated in frequency in the same amount as the received signal.

In another embodiment, step 506 may further include generating a squared magnitude of the second signal by multiplying the second signal by itself. The squaring of the second signal produces similar or same IMD products of the interfering signal as may be present in the first signal.

Process 500 then proceeds to step 508, which includes subtracting the third signal from the first signal to reduce the undesired signal in the first signal. Step 508 may be performed by a cancellation module, such as OOB/IM2 cancellation module 356, for example. In an embodiment, the third signal is multiplied by a weight before subtracting it from the first signal. The weight may depend on whether OOB emissions or IMD products due to the interfering signal are being reduced in the first signal. In an embodiment, the weight is provided by a statistics measurement module, such as statistics measurement module 358, for example.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments, but should be defined only in accordance with the following claims and their equivalents.

What is claimed is:

1. A method for reducing interference in a receiver, comprising:
    receiving a first signal, wherein the first signal includes a desired signal and an undesired signal that results from an interfering signal being applied to a first path;
    generating a second signal, wherein generating the second signal comprises applying the interfering signal to a second path;
    processing the second signal to generate a third signal, including adjusting the second signal based on a difference between a first transfer function of the first path and a second transfer function of the second path;
    subtracting the third signal from the first signal to reduce the undesired signal in the first signal;
    collecting measurements and statistics relating to the first signal and the third signal; and
    multiplying the third signal by a weighted value, to the subtracting the third signal from the first signal, wherein the weighted value is calculated based on the collected measurements and statistics.

2. The method of claim 1, wherein the undesired signal includes one or more of out-of-band emissions and intermodulation distortion products due to the interfering signal.

3. The method of claim 1, wherein the interfering signal is due to a co-located transmitter.

4. The method of claim 3, wherein the first path includes a board coupling path between the co-located transmitter and a receive path of the receiver.

5. The method of claim 3, wherein the first path includes an over-the-air propagation path between an antenna of the co-located transmitter and an antenna of the receiver and a receive path of the receiver.

6. The method of claim 5, wherein the second path includes a feedback receive path of the receiver, and wherein applying the interfering signal to the second path comprises:
    coupling the feedback receive path to the antenna of the co-located transmitter to generate a fourth signal, wherein the interfering signal is present at the antenna of the co-located transmitter; and down-converting the fourth signal based on a transmit center frequency of the interfering signal to generate the second signal.

7. The method of claim 6, wherein processing the second signal further comprises: converting the second signal to a center frequency, wherein the center frequency is equal to a difference between the transmit center frequency of the interfering signal and a receive center frequency of the desired signal.

8. The method of claim 6, wherein processing the second signal further comprises: generating a squared magnitude of the second signal.

9. The method of claim 5, wherein the second path includes a digital interface of the receiver, and wherein applying the interfering signal to the second path comprises: coupling a signal point of a transmit path of the co-located transmitter to the digital interface to generate the second signal, wherein the interfering signal is present at the signal point.

10. The method of claim 9, wherein the signal point is an output of a framer of the transmit path of the co-located transmitter.

11. The method of claim 9, wherein processing the second signal further comprises: converting a sample rate of the second signal according to a sampling rate difference between the desired signal and the interfering signal.

12. The method of claim 11, wherein the sample rate of the second signal and a sample rate of the desired signal are derived from a common reference clock.

13. The method of claim 5, wherein the second path includes a feedback receive path of the receiver, and wherein applying the interfering signal to the second path comprises: coupling the feedback receive path to a power detector, wherein the power detector is coupled to an input of the receive path of the receiver.

14. The method of claim 1, wherein the weighted value is based on a confidence level associated with the third signal.

15. A receiver, comprising:
a receive path configured to generate a first signal, wherein the first signal includes a desired signal and an undesired signal that results from an interfering signal being applied to a first path;
a feedback receive path configured to generate a second signal from the interfering signal;
processing circuitry configured to process the second signal to generate a third signal, wherein the processing circuitry is further configured to adjust the second signal based on a difference between a first transfer function of the first path and a second transfer function of the feedback receive path;
a cancellation module configured to subtract the third signal from the first signal to reduce the undesired signal in the first signal; and
a statistics measurement module configured to collect measurements and statistics relating to the first signal and the third signal,
wherein the cancellation module is further configured to multiple the third signal by a weighted value, prior to subtracting the third signal from the first signal, wherein the weighted value is calculated based on the collected measurements and statistics.

16. The receiver of claim 15, wherein the interfering signal is due to a co-located transmitter.

17. The receiver of claim 16, wherein the first path includes an over-the-air propagation path between an antenna of the co-located transmitter and an antenna of the receiver and the receive path of the receiver.

18. The receiver of claim 17, wherein the feedback receive path comprises:
a coupler configured to couple to the antenna of the co-located transmitter to generate a fourth signal, wherein the interfering signal is present at the antenna of the co-located transmitter; and
a down-converter configured to down-convert the fourth signal based on a transmit center frequency of the interfering signal to generate the second signal.

19. The receiver of claim 18, wherein the processing circuitry comprises: a frequency modulator configured to convert the second signal to a center frequency, wherein the center frequency is equal to a difference between the transmit center frequency of the interfering signal and a receive center frequency of the desired signal.

20. The receiver of claim 18, wherein the processing circuitry comprises: a delay match module configured to adjust the second signal based on a timing offset between the first path and the feedback receive path.

21. The receiver of claim 17, wherein the feedback receive path comprises: a power detector configured to measure a power at an input of the receive path to generate the second signal.

22. The receiver of claim 15, wherein the weighted value is based on a confidence level associated with the third signal.

23. A receiver, comprising:
a receive path configured to generate a first signal, wherein the first signal includes a desired signal and an undesired signal that results from an interfering signal being applied to a first path;
a digital interface configured to generate a second signal from the interfering signal and to convert a sample rate of the second signal according to a sampling rate difference between the desired signal and the interfering signal;
processing circuitry configured to process the second signal to generate a third signal, wherein the processing circuitry is further configured to adjust the second signal based on a first transfer function of the first path; and
a cancellation module configured to subtract the third signal from the first signal to reduce the undesired signal in the first signal.

24. The receiver of claim 23, wherein the interfering signal is due to a co-located transmitter.

25. The receiver of claim 24, wherein the first path includes an over-the-air propagation path between an antenna of the co-located transmitter and an antenna of the receiver and the receive path of the receiver.

26. The receiver of claim 24, wherein the digital interface is configured to couple to a signal point of a transmit path of the co-located transmitter to generate the second signal.

27. The receiver of claim 26, wherein the signal point is an output of a flamer of the transmit path of the co-located transmitter.

28. The receiver of claim 23, wherein the processing circuitry comprises: a frequency modulator configured to convert the second signal to a center frequency, wherein the center frequency is equal to a difference between a transmit center frequency of the interfering signal and a receive center frequency of the desired.

29. The receiver of claim 23, wherein the processing circuitry comprises: a delay match module configured to adjust the second signal based on a delay of the first path.

30. A receiver, comprising:
- a receive path configured to generate a first signal, wherein the first signal includes a desired signal and an undesired signal that results from an interfering signal being applied to a first path;
- a feedback receive path configured to generate a second signal from the interfering signal;
- processing circuitry configured to process the second signal to generate a third signal, wherein the processing circuitry is further configured to adjust the second signal based on a difference between a first transfer function of the first path and a second transfer function of the feedback receive path;
- a frequency modulator, implemented within the processing circuitry, configured to convert the second signal to a center frequency, wherein the center frequency is equal to a difference between a transmit center frequency of the interfering signal and a receive center frequency of the desired signal; and
- a cancellation module configured to subtract the third signal from the first signal to reduce the undesired signal in the first signal.

\* \* \* \* \*

UNITED STATES PATENT AND TRADEMARK OFFICE
CERTIFICATE OF CORRECTION

| | | |
|---|---|---|
| PATENT NO. | : 9,014,651 B2 | Page 1 of 1 |
| APPLICATION NO. | : 13/608357 | |
| DATED | : April 21, 2015 | |
| INVENTOR(S) | : Tujkovic et al. | |

It is certified that error appears in the above-identified patent and that said Letters Patent is hereby corrected as shown below:

In the Claims

Column 12, line 45, claim 1, replace "value, to" with --value, prior to--

Column 13, line 58, claim 15, replace "multiple" with --multiply--

Column 14, line 56, claim 27, replace "flamer" with --framer--

Column 14, line 64, claim 28, replace "desired." with --desired signal.--

Signed and Sealed this
Fifteenth Day of September, 2015

Michelle K. Lee
*Director of the United States Patent and Trademark Office*